United States Patent [19]

Allread et al.

[11] Patent Number: 4,768,551
[45] Date of Patent: Sep. 6, 1988

[54] CONNECT-UNDER-PRESSURE COUPLING

[75] Inventors: Alan R. Allread, Jackson; Russell L. Rogers, Munith, both of Mich.

[73] Assignee: Aeroquip Corporation, Jackson, Mich.

[21] Appl. No.: 71,384

[22] Filed: Jul. 9, 1987

[51] Int. Cl.[4] ............................................. F16L 37/28
[52] U.S. Cl. .......................... 137/614.04; 137/614.01; 137/614.03
[58] Field of Search ...................... 137/614.01, 614.03, 137/614.04, 614.02

[56] References Cited

U.S. PATENT DOCUMENTS 3,215,161 11/1965 Goodwin et al. ............... 137/614.04
3,217,746 11/1965 Voisine ........................... 137/614.04

Primary Examiner—A. Michael Chambers
Attorney, Agent, or Firm—Beaman & Beaman

[57] ABSTRACT

A coupling for pressurized fluid medium circuits such as hydraulic or air wherein the coupling parts may be easily manually interconnected even though the fluid systems communicating with the parts are under high pressure. The coupling parts include self-sealing valves axially displaceable between open and closed positions and the valves include faces exposed to the pressurized medium, the faces being of substantially equal area and disposed in opposite directions such that the axial forces imposed on the valves by the pressurized medium are substantially counterbalanced. Such pressurized faces including elastomeric seals and valve seat shoulders.

7 Claims, 2 Drawing Sheets

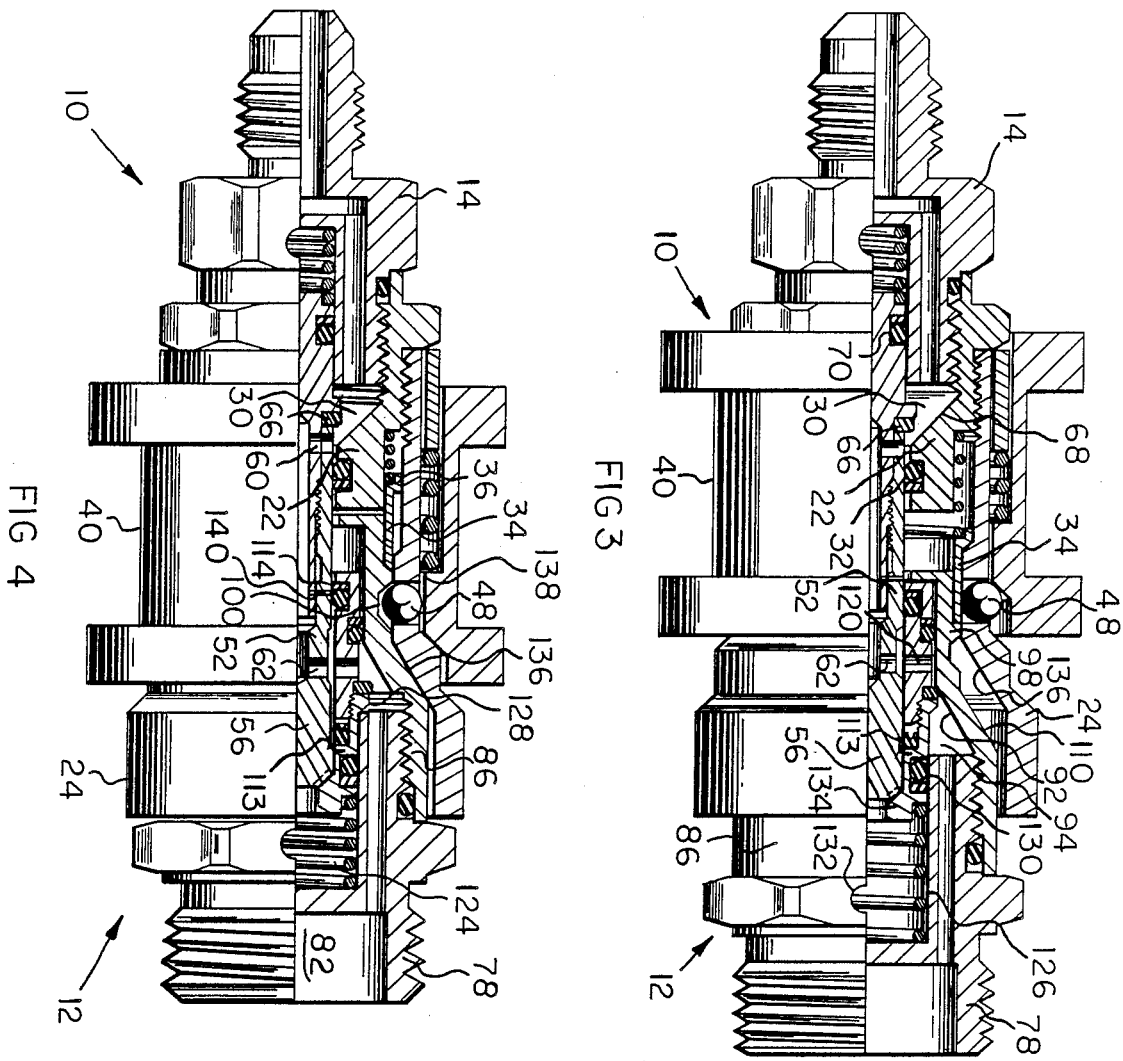

CONNECT-UNDER-PRESSURE COUPLING

BACKGROUND OF THE INVENTION

Fluid couplings are employed to interconnect components of pressurized fluid medium systems wherein the components may be selectively interconnected and disconnected. Manually operated couplings have long been employed to permit such interconnection, and various techniques have been used to reduce the forces required to assemble the coupling parts.

In many couplings for fluid systems at least one of the coupling parts includes a self-sealing valve retaining the pressurized fluid connected to that part, and the other coupling part includes means for displacing the self-sealing valve as the coupling parts are assembled. As the pressurized medium imposes a biasing force on the valve toward the closed condition the axial force produced by the pressurized medium must be overcome during the coupling assembly procedure. When using couplings in high pressure circuits, the axial forces required to connect the coupling parts due to pressurized force imposed on the valve may be very high rendering manual coupling difficult. For instance, breathing apparatus utilized by fire fighters wherein compressed air is supplied to pressure regulators operate at 4500 psi and the breathing apparatus must be connected to the compressed air tank while under such pressure.

It is an object of the invention to provide a connect-under-pressure coupling for use with pressurized fluid systems wherein at least one of the coupling parts includes a self-sealing valve, and wherein the valve construction is such that the valve operation is substantially unaffected by the pressure of the associated system.

Another object of the invention is to provide a connect-under-pressure coupling consisting of a pair of connectable parts each having axially displaceable self-sealing valves wherein each of the valves includes opposed faces exposed to the pressurized medium of substantially equal area to counter-balance axial forces imposed upon the valves by the medium.

An additional object of the invention is to provide a connect-under-pressure coupling having balanced axially displaceable self-sealing valves wherein the coupling configuration is concise and the components may be economically manufactured.

In the practice of the invention the connect-under-pressure coupling consists of two interconnectable parts, a male part and a female part, each having an axially displaceable self-sealing valve. As the parts are coupled the valves engage and simultaneously displace each other from their closed positions to open positions. Sealing between the parts occurs during coupling and uncoupling, and upon the parts being fully coupled, positive latch structure locks the assembled parts.

Each of the valves includes annular radially disposed faces exposed to the pressurized medium within the associated part. These faces may occur in sealing structure, and the faces associated with a common valve are in opposed axial relationship wherein the fluid forces imposed on the faces biases the associated valve in opposite axial directions. As the areas of the faces of a common valve are substantially equal, a balanced valve condition occurs such that, regardless of the extent of the pressure within the part, the effort required to displace the valve remains substantially constant. Compression springs are associated with the valves biasing the valves toward the closed position, and the springs are relatively weak so as not to significantly affect the axial coupling connection force, but the springs do insure that the valves will be biased to the closed position if the fluid system is unpressurized.

The coupling components are so related as to result in a concise configuration and yet the latch may be readily manually operated, even under adverse visibility conditions, and as the coupling permits the parts to be easily manually interconnected even with high pressure systems the coupling is readily usable with high pressure compressed air breathing systems.

BRIEF DESCRIPTION OF THE DRAWINGS

The aforementioned objects and advantages of the invention will be appreciated from the following description and accompanying drawings wherein:

FIG. 3 is an elevational, partially sectioned view illustrating the coupling parts in a partially coupled condition, and FIG. 4 is an elevational, partially sectioned view of the coupling in accord with the invention illustrating the parts in the fully coupled condition.

DESCRIPTION OF THE PREFERRED EMBODIMENT

Figure 1:
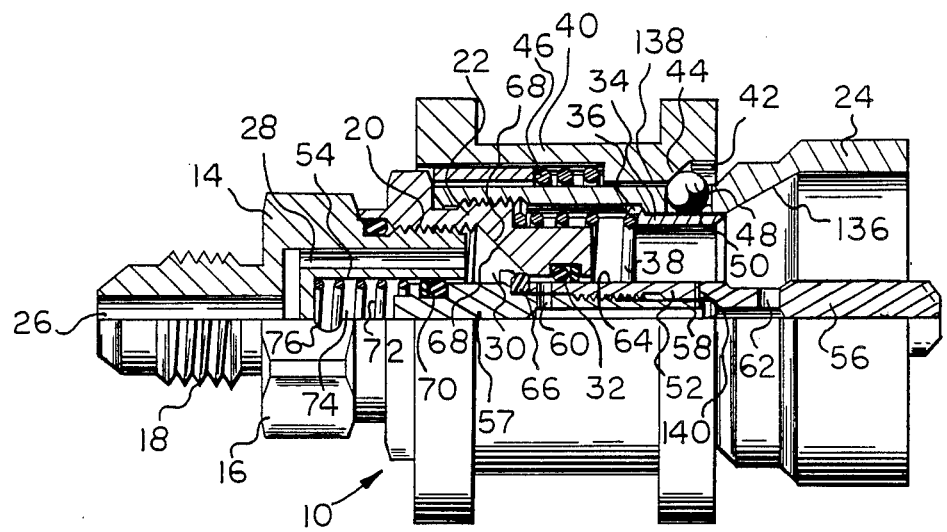
FIG. 1 is an elevational, partially sectioned view of the female part of a copuling in accord with the invention.
Figure 2:
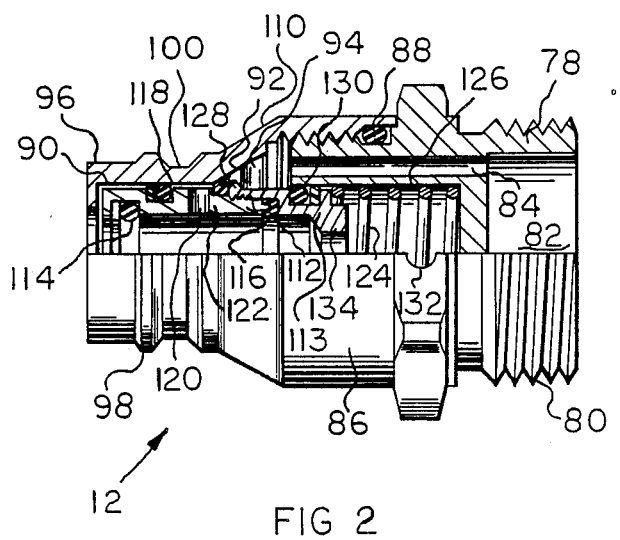
FIG. 2 is an elevational, partially sectioned view of a male part of the coupling in accord with the invention.

The connect-under-pressure coupling of the invention basically consists of a female part 10, FIG. 1, and a male part 12, FIG. 2. The components of the female part are best appreciated from FIG. 1.

Part 10 includes an adapter 14 having hexagonal wrench-engaging surfaces 16 and external threads 18 for receiving the nut of the conduit with which the part 10 is associated, not shown. The adapter 14 includes threads 20 upon which the annular inner sleeve 22 is threaded, and sleeve 22 is threaded for receiving the outer sleeve 24. The adapter includes a passage 26 in communication with the left end of the adapter, which constitutes a conduit connectable end, and the right end of the sleeve 24 is open to receive the male part 12, as later described.

The adapter passage 26 communicates with a plurality of axially extending passages 28 communicating with a chamber 30 defined in the part 10 by the sleeve 22. The sleeve 22 is provided with a cylindrical bore and an elastomeric seal 32 which also comprises a portion of the flow path through the part 10 when the valve thereof is in an open position.

Internally, the outer sleeve 24 is provided with an axially displaceable detent ball retainer 34 having a shoulder 36 engagable with a sleeve shoulder which limits outward movement of the retainer to the right, FIG. 1. The retainer 34 is biased to the right by the compression spring 38.

Externally, the sleeve 24 is encompassed by the manually-operated axially-displaceable release collar 40 having a ball detent operating recess 42 including cam surface 44. The collar 40 is biased toward the right, FIG. 1, by compression spring 46 and the collar includes a pair of radially extending flanges to permit finger manipulation of the collar for moving the collar 40 to the left against the biasing force of spring 46. The detent balls 48, only one of which is shown, are each received within a radial opening 50 defined in sleeve 24 and are prevented from radial displacement inwardly by the retainer 34, the ball detents 48 thereby limiting movement of the collar 40 to the right with the components as shown in FIG. 1.

A self-sealing valve 52 is formed of two parts threaded together and is reciprocally mounted for axial displacement within the adapter concentric bore 54. The bore 52 includes a closed nose part 56 and the rear part 57, an internal chamber 58, radial ports 60 and 62, cylindrical surface 64, a plastic seal ring 66 held in place by part 56 for engaging the oblique sleeve valve seat 68, and a recess receiving the elastomeric seal ring 70 which seals the valve with respect to the adapter bore 54. Compression spring 72 biases the valve 52 to the right, FIG. 1, for engagement of the head 66 with the seat 68, and the chamber 74 is vented to the atmosphere through port 76.

Upon a pressurized medium conduit, not shown, being attached to the adapter 14, the pressurized medium will enter the chamber 30. The valve seal ring 66 includes a radial face against which the internal pressure within chamber 30 acts endeavoring to bias the valve 52 to the right, and the internal pressure within the chamber also engages the seal 70 which also defines a pressure face tending to bias the valve 52 to the left. The effective area of the faces of the seal ring 66 and seal 70 are substantially equal and counterbalance each other such that the axial force necessary to displace the valve 52 to the left when the part 10 is pressurized is only that force required to compress the light compression spring 72. The compression spring 72 will insure the engagement of the ring 66 with the valve seat 68 under non-pressurized conditions.

The components comprising the male part 12 are best shown in FIG. 2. The adapter 78 is provided with hexagonal wrench flats and exterior threads 80 wherein the adapter may be threaded upon a conduit, not shown, comprising a part of the pressurized fluid circuit with which the coupling is employed. The adapter includes a passage 82 communicating with a plurality of axially extending passages 84.

A nose sleeve 86 is threaded upon the adapter 78 and sealed thereto by O-ring 88. The nose sleeve, interiorly, includes the cylindrical surface 90 intersected by the valve seat surface 92 defining chamber 94 communicating with passages 84, and, exteriorly, the nose sleeve includes cylindrical surface 96 and annular ridge 98, the ridge being adjacent the annular detent-receiving recess 100. Oblique surface 110 also defines an abutment surface, as later described.

A two tubular valve is axially displaceable within the adapter cylindrical surface 90 and consists of parts 112 and 113 threaded together. The valve includes internal elastomeric seals 114 and 116, each located within a groove, and seal 118 engages the nose sleeve surface 90. Radial ports 120 establish communication between the valve bore 122 and the valve exterior, and compression spring 124 within the adapter bore 126 biases the valve to the left, FIG. 2. The valve 112-113 seals with respect to the nose sleeve 86 by engagement of the valve seal ring 128 clamped between the parts with the nose sleeve seat 92, and elastomeric seal 130 seals the valve with respect to the adapter bore 126.

The radial dimension of the valve seal ring 128 defines a pressure face communicating with chamber 94 tending to bias the valve to the left, while the seal 130 and associated groove define a radial pressure face in communication with the chamber wherein pressurized medium engaged thereby tends to displace the valve 112-113 to the right. The pressure faces of the seal 128 and seal 130 are substantially equal, thereby counterbalancing the axial forces imposed upon the valve 112-113, and the compression spring 124 assures engagement of the valve head with the valve seat when the part 12 is depressurized. Venting of the bore 126 is through port 132.

When it is desired to couple the parts 10 and 12 the longitudinal axes of the parts are aligned and the male part nose sleeve 86 is inserted into the open end of the female part 10. FIG. 3 illustrates the relationship of the components upon the nose sleeve surface 90 being received with the ball detent retainer ring 34, and at this position the valve 52 will be received within the cylindrical bore 122 of the female part valve 112-113 wherein the cylindrical surface of the valve 52 will be in a sealed relationship to seals 114 and 116. The end of the nose 56 will be substantially engaging the inwardly formed shoulder 134 of valve 112-113, and the ports 62 and 120 will be in substantial radial alignment.

Continued movement of the parts 10 and 12 toward each other displaces the detent retainer ring 34 to the left, FIGS. 3 and 4, and displaces the valve seal 66 from engagement with the valve seat 68, and the valve seal 128 from the valve seat 92, and fluid passage between parts 10 and 12 is established through passage bore 26, passages 28, chamber 30, ports 60 and 62, chamber 58, ports 62 and 120, chamber 94, passages 84 and passage 82. Movement of the parts 10 and 12 toward each other continues until outer sleeve surface 136 engages surface 110 of the female nose sleeve, and at this time the retainer 34 clears the detents and the ball detents 48 will be in alignment with the annular recess 100 permitting the ball detents to be biased inwardly by the locking sleeve cam surface 44 such that release collar surface 138 will maintain the balls in the recess 100 producing a positive interconnection between the parts 10 and 12 to prevent their separation. The components will now be as shown in FIG. 4 and fluid passage is established between the coupling parts as described above.

Because of the substantially equal pressure faces of the valve seal 66 and seal 70, and valve seal 128 and seal 130, the relative axial movement of the coupling parts toward each other, and the displacement of the valves 52 and 112-113, requires only a minimum of axial force sufficient to compress springs 72 and 124, and while one or both of the coupling parts may be under high pressure, interconnection of the coupling parts may be readily manually accomplished. For instance, with a pressurized system operating at 4500 psi, only 20 pounds of forces is necessary to accomplish connection of the coupling parts.

To uncouple the parts 10 and 12, the release collar 40 is grasped and moved to the left, FIG. 4, to radially align the ball detents 48 with the recess 42. This action permits the ball detents to be radially displaced outwardly as the parts separate and the operative relationship of the components will be the reverse of the connection sequence with the valves returning to the relationships shown in FIGS. 1 and 2 when the parts are fully disengaged.

The seal rings 32, 70, 114, 116, 128 and 130 are constructed of a similar configuration consisting of O-rings and retainers, and the seal rings 66 and 128 are preferably formed of Kel-F plastic material. By firmly clamping the seal rings 66 and 128 firmly between the valve parts 56 and 57, and 112 and 113, respectively, the seal rings will not blow out under high pressure use and provide an efficient seal against their associated valve seat surface.

A small vent hole 140 is formed in valve 52 to vent seal 114 and the leading edge of valve nose 56 is beveled and provided with a V-shaped notch 142, and after the valves are closed, and during disconnect, the vent 140 and notch 142 allow trapped high pressure air to escape to the atmosphere without displacing seals from their grooves.

It is appreciated that various modifications to the inventive concepts may be apparent to those skilled in the art without departing from the spirit and scope of the invention.

We claim:

1. A self-sealing fluid coupling characterized by its ease of coupling while under high pressure comprising, in combination, male and female interconnectable parts each having an axial passage, a conduit connectable end, and an open end, releasable mating connecting means defined on said parts for selectively interconnecting said parts when fully coupled, a first self-sealing valve axially displaceable within said passage of said male part positionable between open and closed positions, valve operating means defined upon said female part engaging said first valve upon said parts being coupled and maintaining said first valve in said open position when said parts are fully coupled, a first chamber defined within said male part in communication with the pressurized medium within said male part, first and second radially disposed faces defined on said first valve each having an area in communication with said first chamber, fluid pressure acting upon said first face area axially biasing said first valve toward said open position, fluid pressure acting upon said second face area axially biasing said first valve toward said closed position, said areas of said first and second faces being substantially equal wherein the axial forces exerted on said first valve by the pressurized medium within said male part are substantially balanced, a second self-sealing valve axially displaceable within said passage of said female part positionable between open and closed positions, said second valve comprising said first valve operating means, a second chamber defined within said female part in communication with the pressurized medium within said female part, third and fourth radially disposed faces defined on said female valve each having an area in communication with said second chamber, fluid pressure acting upon said third face area biasing said second valve toward said open position, fluid pressure acting upon said fourth face area axially biasing said second valve toward its closed position, said areas of said third and fourth faces being substantially equal wherein the axial forces exerted on said second valve by the pressurized medium within said female part are substantially balanced, said second valve being of an elongated form having an external surface and an internal passage defined therein having inner and outer opposite ends, a first port defined in said second valve interconnecting said external surface and said passage inner end, a second port defined in said second valve interconnecting said external surface and said passage outer end, a seal defined in said male part sealingly engaging said second valve external surface during interconnection of said parts and prior to said parts being fully coupled whereby said inner port will be in communication with said second chamber and said outer port will be in communication with said first chamber, said inner and outer ports establishing communication between said first and second chambers prior to said parts being fully coupled.

2. In a self-sealing fluid coupling as in claim 1, a compression spring within male part biasing said first valve toward said closed position.

3. In a self-sealing fluid coupling as in claim 1, said first and second faces comprising annular shoulders concentrically related to said passage of said male part.

4. In a self-sealing fluid coupling as in claim 1, a compression spring within said female part biasing said second valve toward its closed position.

5. In a self-sealing fluid coupling as in claim 4, said third and fourth faces comprising annular shoulders concentrically related to said passage of said female part.

6. In a self-sealing fluid coupling as in claim 1, each of said valves consisting of two parts threadedly interconnected, and a seal ring clamped between the parts of a common valve by the threaded interconnection of the associated valve parts.

7. In a self-sealing fluid coupling as in claim 6, said seal rings defining said second and fourth face areas.

* * * * *